United States Patent [19]
Eaton et al.

[11] Patent Number: 5,694,042
[45] Date of Patent: Dec. 2, 1997

[54] ANGULAR DISPLACEMENT SENSOR FOR ROTATIONALLY RECIPROCATING ELEMENTS

[75] Inventors: William Eaton, Brooklyn Park, Minn.; Michael Schneider, Hagen; Dirk Brasse, Schalksmuehle, both of Germany

[73] Assignee: Turck, Inc., Plymouth, Minn.

[21] Appl. No.: 529,291

[22] Filed: Sep. 15, 1995

[51] Int. Cl.[6] .............................. G01B 7/14; G01B 7/30; G01R 33/00

[52] U.S. Cl. .............................. 324/207.22; 324/207.25; 901/46

[58] Field of Search .............................. 324/207.22, 207.25, 324/207.24, 207.15, 207.23, 207.11, 226, 262; 901/46, 9, 14, 19

[56] References Cited

U.S. PATENT DOCUMENTS 5,469,053  11/1995  Laughlin .............................. 324/207.24

Primary Examiner—Walter E. Snow
Attorney, Agent, or Firm—Moore & Hansen

[57] ABSTRACT

An angular displacement sensor for determining the location of a rotating element such as a power clamp, fixedly attached to the power clamp adjacent the clamp arm. Specifically, the angular displacement sensor includes a rotating portion within a stationary housing, the rotating portion being directly connected to the axle that attaches the clamp arm to the connecting rods driven by the piston. By sensing the position of the rotating portion of the angular displacement sensor, which is directly connected to the axle and thereby rotates in direct proportion to the movement of the clamp arm, the sensor may easily determine the position of the clamp arm.

30 Claims, 3 Drawing Sheets

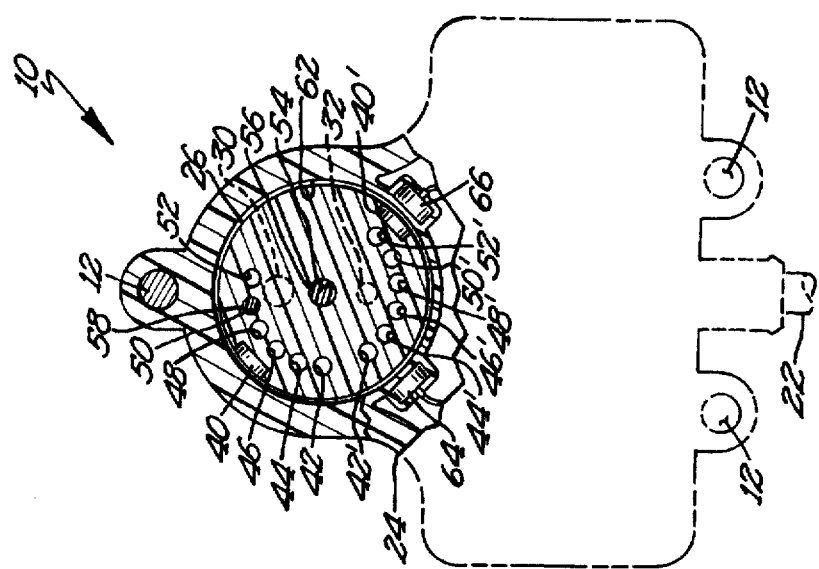
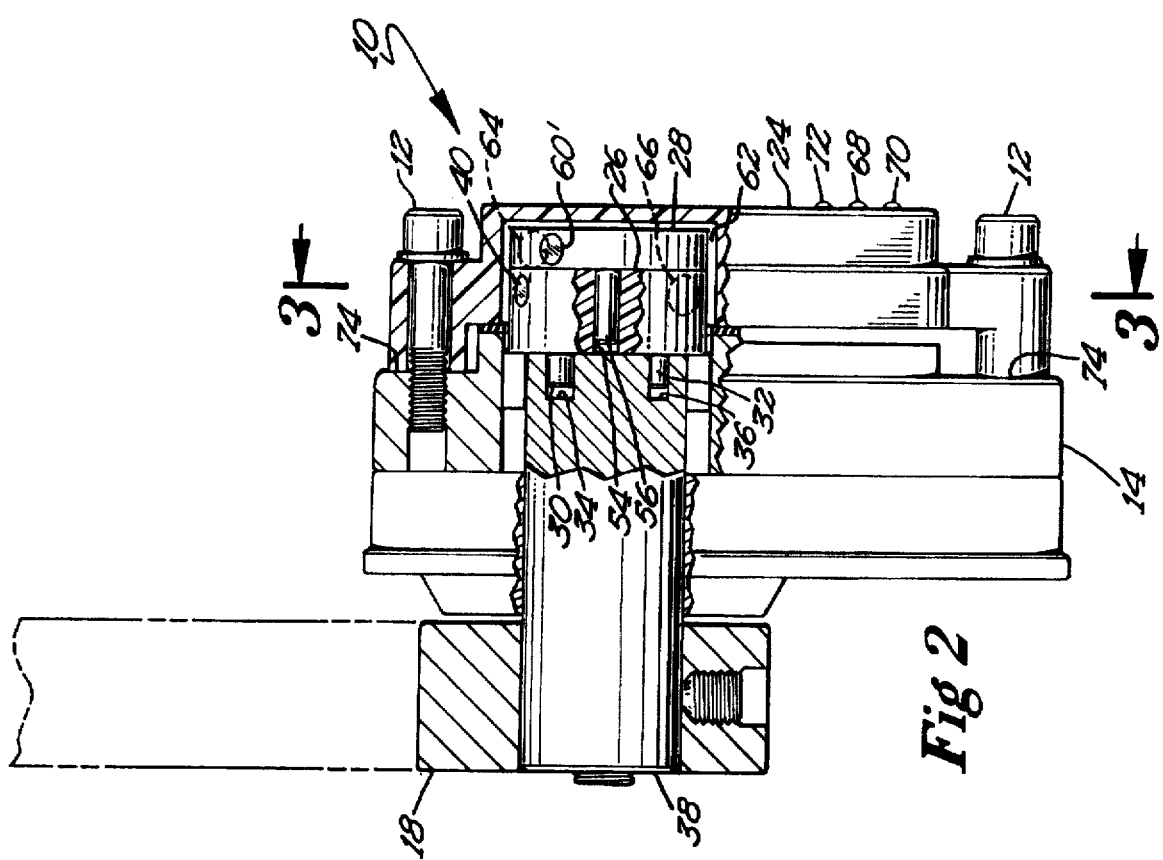

ANGULAR DISPLACEMENT SENSOR FOR ROTATIONALLY RECIPROCATING ELEMENTS

BACKGROUND OF THE INVENTION

1. Technical Field

The present invention relates generally to sensors for determining the location of a rotating element, and more specifically to sensors utilized to detect the rotary position of a driven shaft.

2. Background Information

Pneumatic and hydraulic cylinder clamps, also referred to as power clamps, are widely used in a variety of industrial applications to aid in the manufacture and assembly of various consumer goods. Power clamps include a clamp arm rotatably positionable between clamping and unclamping positions. Because of the enormous loads generally required of the clamp arm, a piston in a pressure cylinder of the power clamp assembly is used to provide the motive force for rotating the clamp arm. The clamp arm is attached to a reciprocating axle linked by one or more connecting rods to the piston. Such clamp arms most commonly travel through an arc ranging from 18° to 118°.

For proper operation of the power clamp assembly, a computer or other programmable controller must be able to detect the position of the clamp arm. Typically, rather than directly determining the position of the clamp arm, sensors have been located at the two ends of the pressure cylinder to indirectly determine the position of the clamp arm by detecting the location of the piston within the cylinder. For proper operation, one sensor must be placed at each end of the cylinder, the first sensor detecting when the piston is extended and the second detecting when the piston is retracted. Several disadvantages are inherent with this arrangement.

First, the sensors of this arrangement are unable to detect whether the clamp arm or the axle are broken or otherwise inoperative, since the motion of the cylinder is unaffected by the condition of the clamp arm or the axle. Second, the sensors may be subjected to extremely high pressures from within the cylinder, which may have a detrimental effect on their performance, and may result in leaks from the cylinder. Furthermore, the cylinder sensors are also exposed to hydraulic and lubricating oils. Although sensors may be made to resist damage from extreme pressure or contaminants, added complexity and expense is necessary in the design and construction of such sensors. Finally, for successful operation of this sensor system, two sensors are required, one at each end of the cylinder, each of which requires a cable connected back to the controller.

The angular displacement sensor of the present invention overcomes difficulties described above and affords other features and advantages heretofore not available.

SUMMARY OF THE INVENTION

The angular displacement sensor of the present invention is fixedly attached to the power clamp adjacent the clamp arm. Specifically, the angular displacement sensor includes a rotating portion within a stationary housing, the rotating portion being directly connected to the axle that attaches the clamp arm to the connecting rods driven by the piston. By sensing the position of the rotating portion of the angular displacement sensor, which is directly connected to the axle and thereby rotates in direct proportion to the movement of the clamp arm, the sensor may easily determine the position of the clamp arm.

The rotating portion of the angular displacement sensor includes two disks or wheels, referred to as a lower programming wheel (LPW) and an upper programming wheel (UPW), respectively, positioned in abutting relation one against the other. The stationary housing includes two sensors for detecting a target in each of the wheels. The first sensor detects a target embedded in the LPW for determining when the clamp arm is in its retracted, or home, position, and the second sensor detects a target embedded in the UPW for determining when the clamp arm is in its extended position. Although the LPW is directly attached to the clamp arm axle in a standard position, the UPW may be adjustably positioned relative to the UPW, depending on the displacement angle between the home position and the extended position of the clamp arm. Once the position of the UPW relative to the LPW has been selected, or programmed, the two wheels are releasably attached to each other and rotate in concert within the housing.

The housing is attached to the casting containing the clamp arm axle and the linkage to the piston. The rotating portion rotates freely within the housing. The housing preferably includes three light emitting diodes (LEDs). One LED, preferably green, indicates that electrical power is being applied to the angular displacement sensor. The other two LEDs, each preferably red, indicate the position of the clamp arm. One red LED will light when the clamp arm is detected in the home position, and the other red LED will light when the clamp arm is in the fully extended position. A single cable extends from the housing to the controller for transmitting the data detected by the angular displacement sensor.

It is an object of this invention to provide a sensor for determining the position of a clamp arm on a pneumatic or hydraulic cylinder clamp. It is a further object of this invention to provide a single sensor for determining the position of the clamp arm requiring only a single cable for transmitting information to the power clamp controller, the sensor being directly attachable to the clamp arm axle rather than to the cylinder portion of the cylinder clamp. It is a further object of this invention to provide an angular displacement sensor that can directly detect whether the clamp arm axle or the linkage between the axle and the piston is broken. It is a further object of this invention to provide an angular displacement sensor capable of reliable operation without exposure to extreme pressure, hydraulic or lubricating oils or other contaminants. Furthermore, since clamp arms may be positioned on the right side or the left side of a power clamp assembly, it is also an object of the present invention to provide an angular displacement sensor that may be positioned compatibly with a clamp arm regardless of whether the clamp arm is located on the right side or the left side of the power clamp assembly.

Other objects and advantages of the invention will become apparent from the following detailed description and from the appended drawings in which like numbers have been used to describe like parts throughout the several views.

BRIEF DESCRIPTION OF THE DRAWINGS

FIG. 2 is a left side sectional view taken along line 2—2 of FIG. 1;

FIG. 3 is a front sectional view taken along line 3—3 of FIG. 2; and

DESCRIPTION OF THE PREFERRED EMBODIMENT

Figure 1:
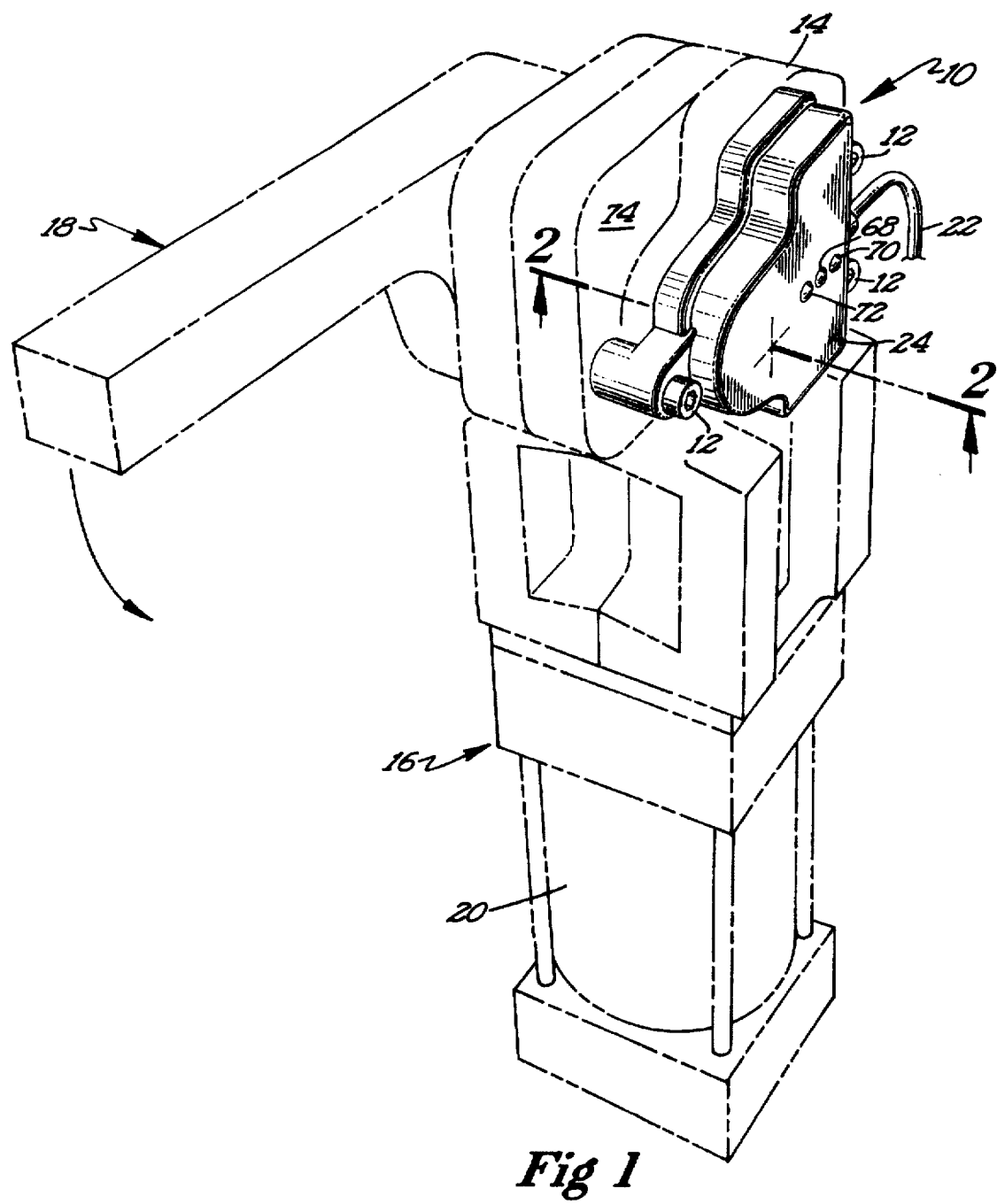
FIG. 1 is a perspective view of the angular displacement sensor of the present invention attached to a cylinder clamp assembly, the cylinder clamp assembly shown in phantom.

With reference to the drawings, and in particular to FIG. 1, the angular displacement sensor for rotary mechanisms is generally indicated by reference numeral 10. Angular displacement sensor 10 is fixedly attached as by threaded screws 12 to the casting 14 of a pneumatic or hydraulic cylinder clamp assembly 16 to which the clamp arm 18 is rotatably fastened. Contained within casting 14 are the elements of the mechanical linkage between clamp arm 18 and the piston (not shown) of power clamp assembly 16, the piston reciprocating within cylinder 20. Clamp arm 18 is angularly displaceable with each stroke of the piston along an arc illustrated by the arrow shown in FIG. 1. Angular displacement sensor 10 is connected to a computer or other programmable controller by cable 22 for transmitting displacement data.

Figure 4:
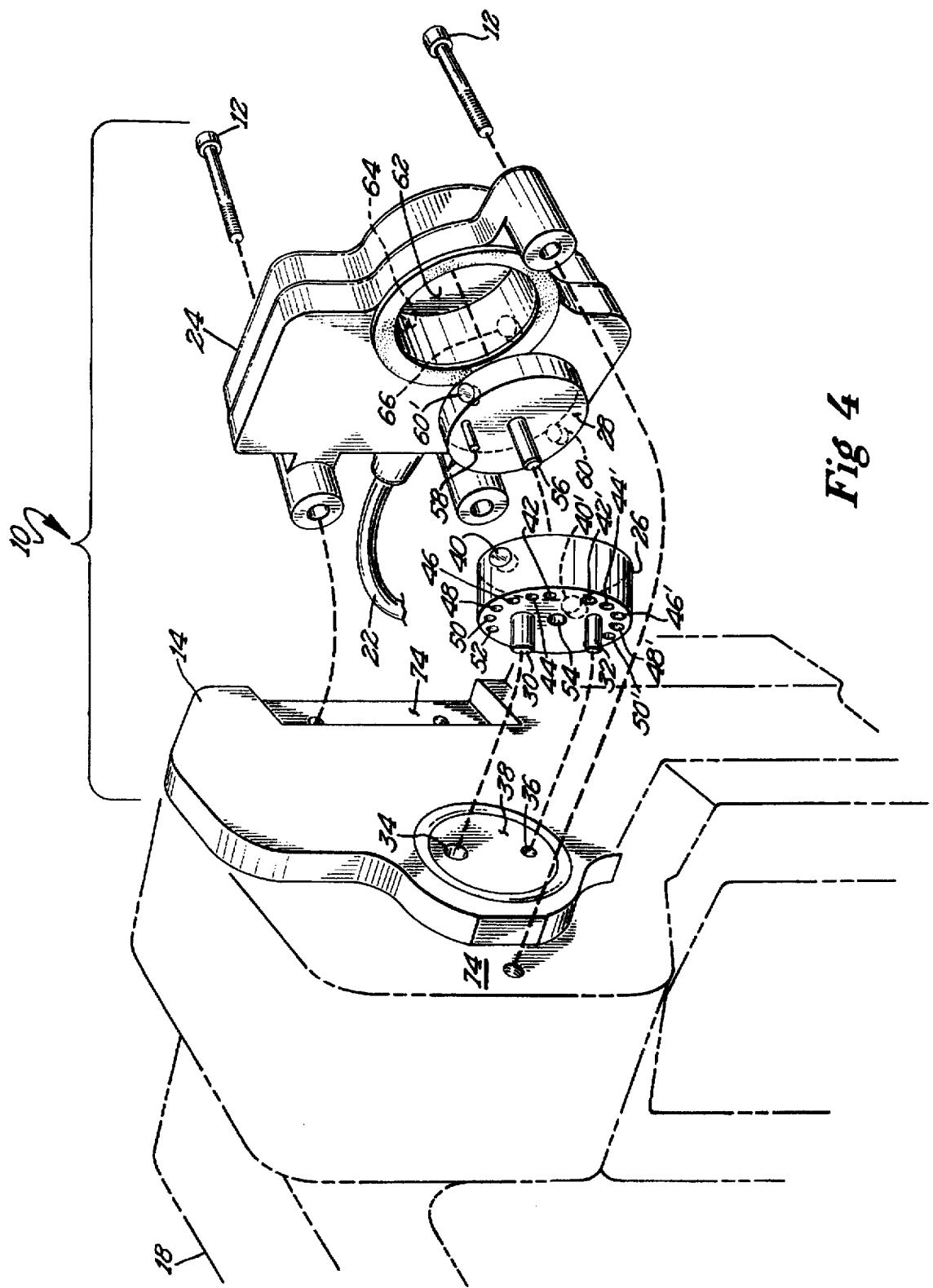
FIG. 4 is an exploded view of the angular displacement sensor.

Referring to FIGS. 2, 3 and 4, angular displacement sensor 10 includes a housing 24 containing a lower programming wheel (LPW) 26 and an upper programming wheel (UPW) 28. LPW 26 includes a large diameter anchor post 30 and a small diameter anchor post 32 projecting from the bottom side thereof. Anchor posts 30, 32 are positioned along the diameter of LPW 26, and engage corresponding receptacles 34, 36, respectively, formed in the end of clamp arm axle 38, to which clamp arm 18 is attached. Anchor posts 30, 32 preferably form a snap fit engagement with corresponding receptacles 34, 36 for securely positioning LPW 26 in position. Anchor posts and receptacles of differing sizes are used to ensure that LPW 26 is not inadvertently incorrectly installed.

Embedded in the periphery of LPW 26 are two targets 40, 40', preferably made of stainless steel. LPW targets 40, 40' are offset from each other by 180°, and are preferably offset from the diameter formed by anchor posts 30, 32 by approximately 45°. LPW 26 also includes twelve programming holes 42-52, 42'-52' radially positioned as shown in FIGS. 3 and 4. First programming hole 42 is positioned 90° from the diameter formed by anchor posts 30, 32. In the preferred embodiment, programming holes 44-52 are offset in a clockwise direction from first programming hole 42 as follows: Programming hole 44 is offset therefrom by 19°; the second adjacent programming hole 46 from first programming hole 42 is offset therefrom by 39°; the third adjacent programming hole 48 from first programming hole 42 is offset therefrom by 60°; the fourth adjacent programming hole 50 from first programming hole 42 is offset therefrom by 79°; and the fifth adjacent programming hole 52 from the first programming hole 42 is offset therefrom by 100°. Similarly, programming holes 42'-52' are offset in a counterclockwise direction from first programming hole 42 as follows: Programming hole 42' is offset therefrom by 37°; the second adjacent programming hole 44' from first programming hole 42 is offset therefrom by 56°; the third adjacent programming hole 46' from first programming hole 42 is offset therefrom by 76°; the fourth adjacent programming hole 48' from first programming hole 42 is offset therefrom by 97°; the fifth adjacent programming hole 50' from first programming hole 42 is offset therefrom by 116°; and the sixth adjacent programming hole 52' from first programming hole 42 is offset therefrom by 137°. All twelve programming holes 42-52, 42'-52' of the preferred embodiment are equidistant from the center of LPW 26, where there is located a central opening 54.

Programming holes 42-52, 42'-52' permit coupling of LPW 26 with UPW 28 in a manner coordinated with the arc of motion programmed for clamp arm 18. To accomplish the appropriate fit between LPW 26 and UPW 28, UPW 28 includes a central anchor post 56 projecting from the center thereof, matable with LPW central opening 54. UPW central anchor post 56 preferably forms a snug, friction-fit engagement with LPW central opening 54 for securely locating UPW 28 in position. Furthermore, UPW 28 also includes a programming pin 58 projecting therefrom, matable with an appropriate programming hole 42-52, 42'-52' on LPW 26.

Embedded in the periphery of UPW 28 are two targets 60, 60', preferably pins made of stainless steel. UPW targets 60, 60' are offset from each other by 180°, and are preferably offset from the diameter passing through central anchor post 56 and programming pin 58 by approximately 26°. Both the LPW targets 40, 40' and UPW targets 60, 60' are preferably 3-4 mm in diameter, although this size may vary depending on the needs of the user of angular displacement sensor 10.

When UPW 28 and LPW 26 have been combined, they form a rotating portion that may then be friction-fit to clamp arm axle 38, as described above. The resulting rotating portion may then be contained within recess 62 of housing 24 of angular displacement sensor 10. It is preferred that a slight gap be present between all sides of the rotating portion and the interior surfaces of recess 62, since the repeated rotations of the rotating portion within recess 62 may result in damage to angular displacement sensor 10 if contact between the components were permitted.

Referring to FIG. 3, embedded within the walls of recess 62 are first and second sensors 64, 66, respectively. These sensors are preferably inductive proximity sensors, and are approximately 5-6 mm in diameter. First sensor 64 is positioned within housing 24 adjacent housing recess 62 in the region proximate to LPW 26 for detecting LPW targets 40, 40', and second sensor 66 is positioned within housing 24 adjacent housing recess 62 in the region proximate to UPW 28 for detecting UPW targets 60, 60'. Referring to FIG. 3, first and second sensors 64, 66 are preferably positioned approximately 45° to the left and right, respectively, of a vertical centerline passing through LPW central opening 54.

Also shown in FIGS. 1 and 2 are first, second and third light emitting diodes (LEDs) 68, 70 and 72, respectively. Preferably, LED 68 is green, and LEDs 70 and 72 are yellow or red. First LED 68 is lighted whenever power is applied to angular displacement sensor 10. Second LED 70 is lighted whenever a LPW target 40, 40' is in the immediate proximity of first sensor 64, and third LED 72 is lighted whenever a UPW target 60, 60' is in the immediate proximity of second sensor 66.

In use, angular displacement sensor 10 will be threadedly attached to the preferably coplanar surfaces 74 of casting 14. It is important that surfaces 74 be coplanar since the rotating portion of angular displacement sensor 10, comprised of LPW 26 and UPW 28, may make millions of rotations within housing 24. If housing 24 is not properly attached to casting 14, generally perpendicular to clamp arm axle 38, interference may be created between the rotating portion and the interior of housing 24, resulting in damage to the unit.

Before attaching angular displacement sensor 10 to casting 14, UPW programming pin 58 must be appropriately located within a programming hole 42-52 or 42'-52' of LPW 26, and LPW 26 must be positioned within the receptacles 34, 36 of clamp arm axle 38. The appropriate programming hole is determined by the angle of the arc formed by the range through which clamp arm 18 rotates in operation, and which side of casting 14 clamp arm 18 is mounted to. If clamp arm 18 is mounted on the left side of casting 14, a corresponding programming hole 42–52 is selected. If clamp arm 18 is mounted on the right side of casting 14, a corresponding programming hole 42'–52' is selected. If clamp arm 18 travels through an arc of 18°, programming hole 42 or 42' is selected, as described above. Similarly, for an arc of 37°, programming hole 44 or 44' is selected. For an arc of 57°, programming hole 46 or 46' is selected. For an arc of 78°, programming hole 48 or 48' is selected. For an arc of 97°, programming hole 50 or 50' is selected. Finally, for an arc of 118°, programming hole 52 or 52' is selected.

Therefore, if clamp arm 18 is mounted to the left side of casting 14 and is traveling through an arc of 97°, UPW programming pin 58 would be inserted into programming hole 50, as illustrated in FIG. 3, with UPW central anchor post 56 being positioned within LPW central opening 54. Anchor posts 30, 32 of LPW 26 may then be positioned within receptacles 34, 36, respectively, of clamp arm axle 38. Finally, housing 24 may be attached to casting 14 using threaded screws 12, with housing recess 62 positioned over the rotating portion formed by LPW 26 and UPW 28. Cable 22 may then be connected to a computer or other programmable controller for transmitting displacement data of clamp arm 18.

While the preferred embodiments of the invention have been described, it should be understood that various changes, adaptations and modifications may be made therein without departing from the spirit of the invention and the scope of the appended claims.

What is claimed is:

1. An angular displacement sensor for use with a reciprocating member having a rotating shaft, comprising:

a lower programming wheel engageable with the rotating shaft of the reciprocating member, said lower programming wheel having a top side and a bottom side;

an upper programming wheel selectively engageable with said lower programming wheel, said upper programming wheel having a top side and a bottom side;

a housing having a recess within which said lower and upper programming wheels rotate;

primary target means embedded in the periphery of said lower programming wheel;

secondary target means embedded in the periphery of said upper programming wheel;

a first sensor member in said housing adjacent said recess for detecting said primary target means of said upper programming wheel; and a second sensor member in said housing adjacent said recess for detecting said secondary target means of said upper programming wheel.

2. The angular displacement sensor described in claim 1, wherein said primary target means comprises:

a first primary target member and a second primary target member, said second primary target member being coplanar with and angularly offset from said first primary target member.

3. The angular displacement sensor described in claim 2, wherein:

said second primary target member is offset from said first primary target member by 180°.

4. The angular displacement sensor described in claim 1, wherein said secondary target means comprises:

a first secondary target member and a second secondary target member, said second secondary target member being coplanar with and angularly offset from said first secondary target member.

5. The angular displacement sensor described in claim 4, wherein:

said second secondary target member is offset from said first secondary target member by 180°.

6. The angular displacement sensor described in claim 1, further comprising:

a first receptacle and a second receptacle formed in the rotating shaft of the reciprocating member; and a first anchor post and a second anchor post projecting from said bottom side of said lower programming wheel removably engageable with said first receptacle and said second receptacle, respectively.

7. The angular displacement sensor described in claim 6, wherein:

said first and second anchor posts are positioned along a diameter of said lower programming wheel, spaced from the center thereof; and said first and second receptacles of the rotating shaft are correspondingly positioned thereon to removably receive said first and second anchor posts; respectively.

8. The angular displacement sensor described in claim 1, further comprising:

programming means for selectively engaging said upper programming wheel and said lower programming wheel.

9. The angular displacement sensor described in claim 8 wherein said programming means comprises:

a central opening in said lower programming wheel;

a plurality of programming openings in said lower programming wheel, said programming openings being positioned equidistant from said central opening, and said programming openings being positioned at intervals around said lower programming wheel;

an anchor post projecting from said bottom side of said upper programming wheel, said anchor post being removably engageable with said central opening of said lower programming wheel; and a programming pin projecting from said bottom side of said upper programming wheel, said programming pin being removably engageable with said programming openings of said lower programming wheel.

10. An angular displacement sensor for use with a reciprocating member having a rotating shaft, comprising:

a rotating portion engageable with the rotating shaft of the reciprocating member, said rotating portion comprising a lower programming wheel engageable with the rotating shaft, said lower programming wheel having a top side and a bottom side, and an upper programming wheel selectively engageable with said lower programming wheel, said upper programming wheel having a top side and a bottom side;

a primary target on said rotating portion for rotation therewith;

a secondary target on said rotating portion for rotation therewith;

a sensor support structure located in cooperative juxtaposition to said rotating portion;

a first sensor member on said support structure in proximity to said rotating portion for detecting said primary target means of said rotating portion; and a second sensor member on said support structure in proximity to said rotating portion for detecting said secondary target means of said rotating portion.

11. The angular displacement sensor described in claim 10, wherein:

said lower programming wheel includes said primary target on the periphery thereof; and said upper programming wheel includes said secondary target on the periphery thereof, for selectively determining the position of said secondary target relative to said primary target.

12. The angular displacement sensor described in claim 11, wherein said primary target further comprises:

a first primary target member and a second primary target member, said second primary target member being coplanar with and angularly offset from said first primary target member.

13. The angular displacement sensor described in claim 12, wherein:

said second primary target member is offset from said first primary target member by 180°.

14. The angular displacement sensor described in claim 11, wherein said secondary target comprises:

a first secondary target member and a second secondary target member, said second secondary target member being coplanar with and angularly offset from said first secondary target member.

15. The angular displacement sensor described in claim 14, wherein:

said second secondary target member is offset from said first secondary target member by 180°.

16. The angular displacement sensor described in claim 11, further comprising:

a first receptacle and a second receptacle formed in the rotating shaft; and a first anchor post and a second anchor post projecting from said bottom side of said lower programming wheel removably engageable with said first receptacle and said second receptacle, respectively.

17. The angular displacement sensor described in claim 11, wherein:

said first and second anchor posts are positioned along a diameter of said lower programming wheel, spaced from the center thereof; and said first and second receptacles of the rotating shaft are correspondingly positioned thereon to removably receive said first and second anchor posts, respectively.

18. The angular displacement sensor described in claim 11, further comprising:

programming means for selectively engaging said upper programming wheel and said lower programming wheel.

19. The angular displacement sensor described in claim 18, wherein said programming means comprises:

a central opening in said lower programming wheel;

a plurality of programming openings in said lower programming wheel, said programming openings being positioned equidistant from said central opening, and said programming openings being positioned at intervals around said lower programming wheel;

an anchor post projecting from said bottom side of said upper programming wheel, said anchor post being removably engageable with said central opening of said lower programming wheel; and a programming pin projecting from said bottom side of said upper programming wheel, said programming pin being removably engageable with said programming openings of said lower programming wheel.

20. An angular displacement sensor for use with a reciprocating member having a rotating shaft, comprising:

a rotating portion engageable with the rotating shaft of the reciprocating member, said rotating portion comprising a lower programming wheel engageable with the rotating shaft, said lower programming wheel having a top side and a bottom side, and an upper programming wheel selectively engageable with said lower programming wheel, said upper programming wheel having a top side and a bottom side;

a housing having a recess within which said rotating portion rotates;

primary target means embedded in the periphery of said rotating portion;

secondary target means embedded in the periphery of said rotating portion; and sensor means in said housing adjacent said recess for detecting said primary target means and said secondary target means of said rotating portion.

21. The angular displacement sensor described in claim 20, wherein said sensor means comprises:

a first sensor member in said housing adjacent said recess for detecting said primary target means of said rotating portion; and a second sensor member in said housing adjacent said recess for detecting said secondary target means of said rotating portion.

22. The angular displacement sensor described in claim 20, wherein:

said lower programming wheel includes said primary target on the periphery thereof; and said upper programming wheel includes said secondary target on the periphery thereof, for selectively determining the position of said secondary target relative to said primary target.

23. The angular displacement sensor described in claim 22, wherein said primary target further comprises:

a first primary target member and a second primary target member, said second primary target member being coplanar with and angularly offset from said first primary target member.

24. The angular displacement sensor described in claim 23, wherein:

said second primary target member is offset from said first primary target member by 180°.

25. The angular displacement sensor described in claim 22, wherein said secondary target comprises:

a first secondary target member and a second secondary target member, said second secondary target member being coplanar with and angularly offset from said first secondary target member.

26. The angular displacement sensor described in claim 25, wherein:

said second secondary target member is offset from said first secondary target member by 180°.

27. The angular displacement sensor described in claim 22, further comprising:

a first receptacle and a second receptacle formed in the rotating shaft; and a first anchor post and a second anchor post projecting from said bottom side of said lower programming wheel removably engageable with said first receptacle and said second receptacle, respectively.

28. The angular displacement sensor described in claim 27, wherein:
    said first and second anchor posts are positioned along a diameter of said lower programming wheel, spaced from the center thereof; and
    said first and second receptacles of the rotating shaft are correspondingly positioned thereon to removably receive said first and second anchor posts, respectively.

29. The angular displacement sensor described in claim 22, further comprising:
    programming means for selectively engaging said upper programming wheel and said lower programming wheel.

30. The angular displacement sensor described in claim 29, wherein said programming means comprises:
    a central opening in said lower programming wheel;
    a plurality of programming openings in said lower programming wheel, said programming openings being positioned equidistant from said central opening, and said programming openings being positioned at intervals around said lower programming wheel;
    an anchor post projecting from said bottom side of said upper programming wheel, said anchor post being removably engageable with said central opening of said lower programming wheel; and
    a programming pin projecting from said bottom side of said upper programming wheel, said programming pin being removably engageable with said programming openings of said lower programming wheel.

* * * * *